(12) United States Patent
Lau et al.

(10) Patent No.: US 8,971,036 B1
(45) Date of Patent: Mar. 3, 2015

(54) HARD DISK DRIVE RETENTION

(71) Applicant: Google Inc., Mountain View, CA (US)

(72) Inventors: Michael Chi Kin Lau, San Francisco, CA (US); Jeffrey Scott Spaulding, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 233 days.

(21) Appl. No.: 13/738,553

(22) Filed: Jan. 10, 2013

(51) Int. Cl.
*G06F 1/16* (2006.01)
*G06F 1/20* (2006.01)

(52) U.S. Cl.
CPC ... *G06F 1/20* (2013.01); *G06F 1/16* (2013.01)
USPC ............ 361/679.36; 361/679.34; 361/679.35; 361/727

(58) Field of Classification Search
CPC ....................................................... G06F 1/187
USPC ................. 361/679.34–679.36, 727
See application file for complete search history.

(56) References Cited

U.S. PATENT DOCUMENTS

| | | | |
|---|---|---|---|
| 5,123,721 A * | 6/1992 | Seo ............................... | 312/333 |
| 6,069,789 A * | 5/2000 | Jung ........................ | 361/679.32 |
| 6,304,457 B1 * | 10/2001 | Liu et al. ........................ | 361/799 |
| 6,972,961 B2 * | 12/2005 | Erskine .......................... | 361/727 |
| 8,325,474 B2 | 12/2012 | Spaulding et al. | |
| 2003/0210519 A1 * | 11/2003 | Wubs ............................ | 361/685 |

* cited by examiner

*Primary Examiner* — Anthony Q Edwards
(74) *Attorney, Agent, or Firm* — Fish & Richardson P.C.

(57) ABSTRACT

The systems and methods described herein include, among other things, a hard disk drive (HDD) retention system that has an HDD carrier assembly into which an HDD is positioned, and which allows an HDD to be inserted and ejected quickly. The carrier assembly includes spring elements, which, upon insertion of the HDD into the carrier assembly, compress, and exert a force on the HDD, retaining it within the assembly, in addition to reducing vibration transmission between the HDD and the carrier assembly.

22 Claims, 10 Drawing Sheets

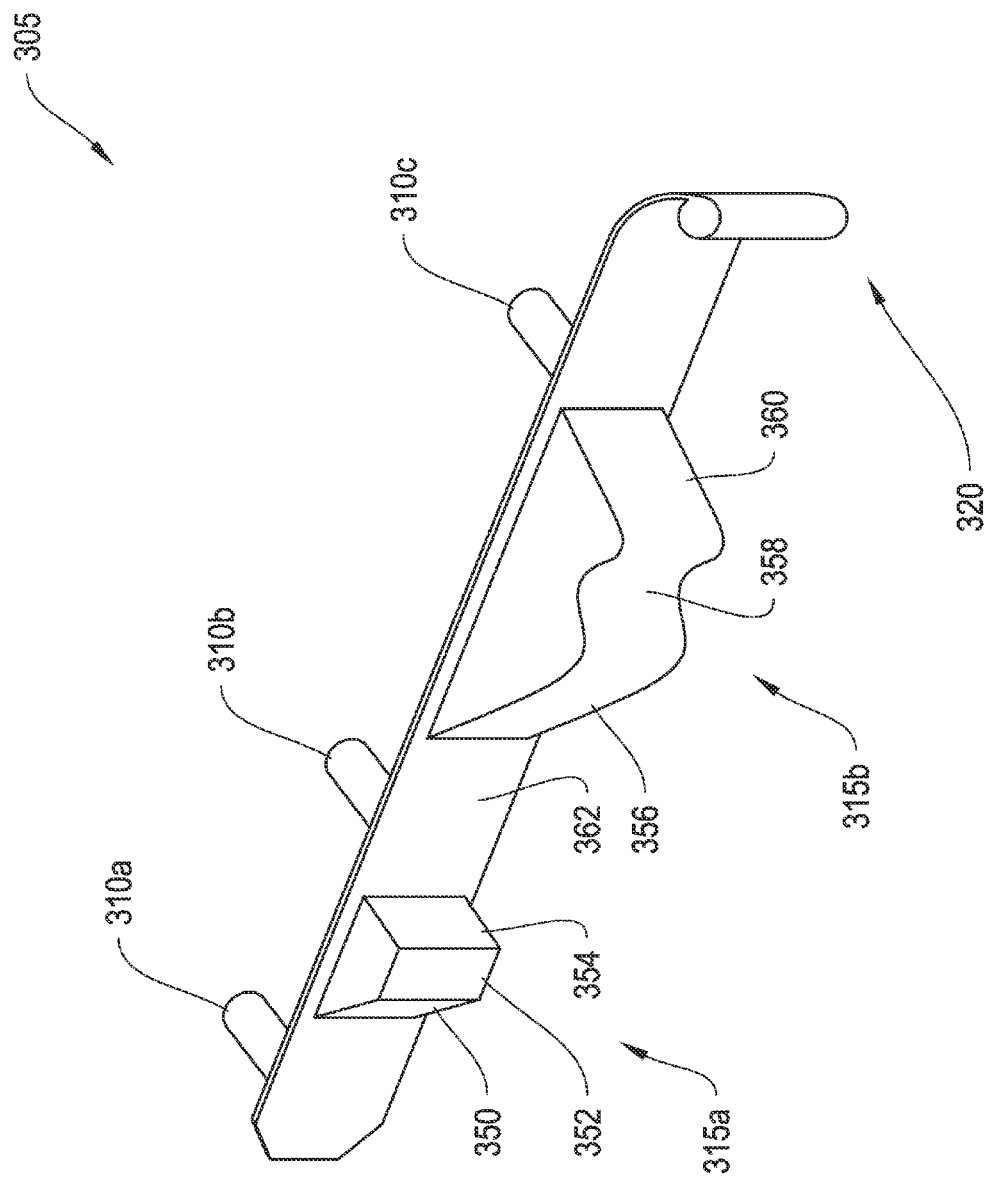

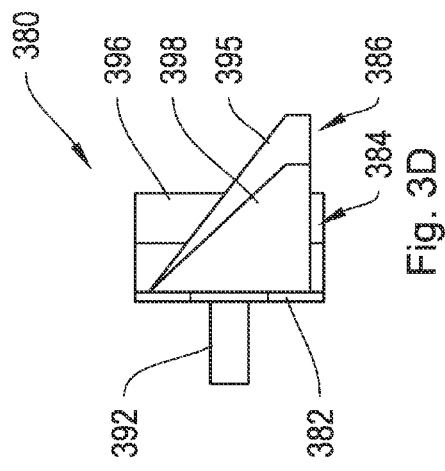
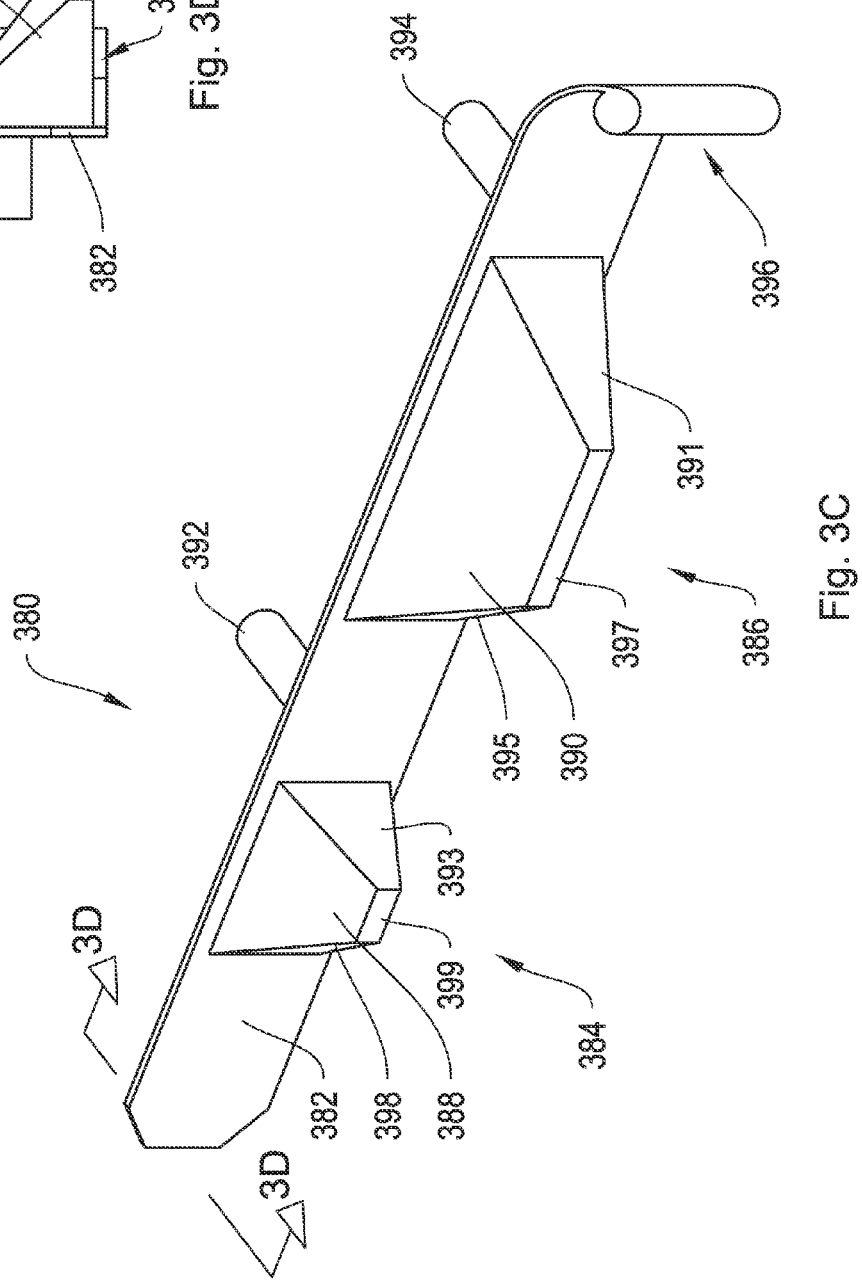

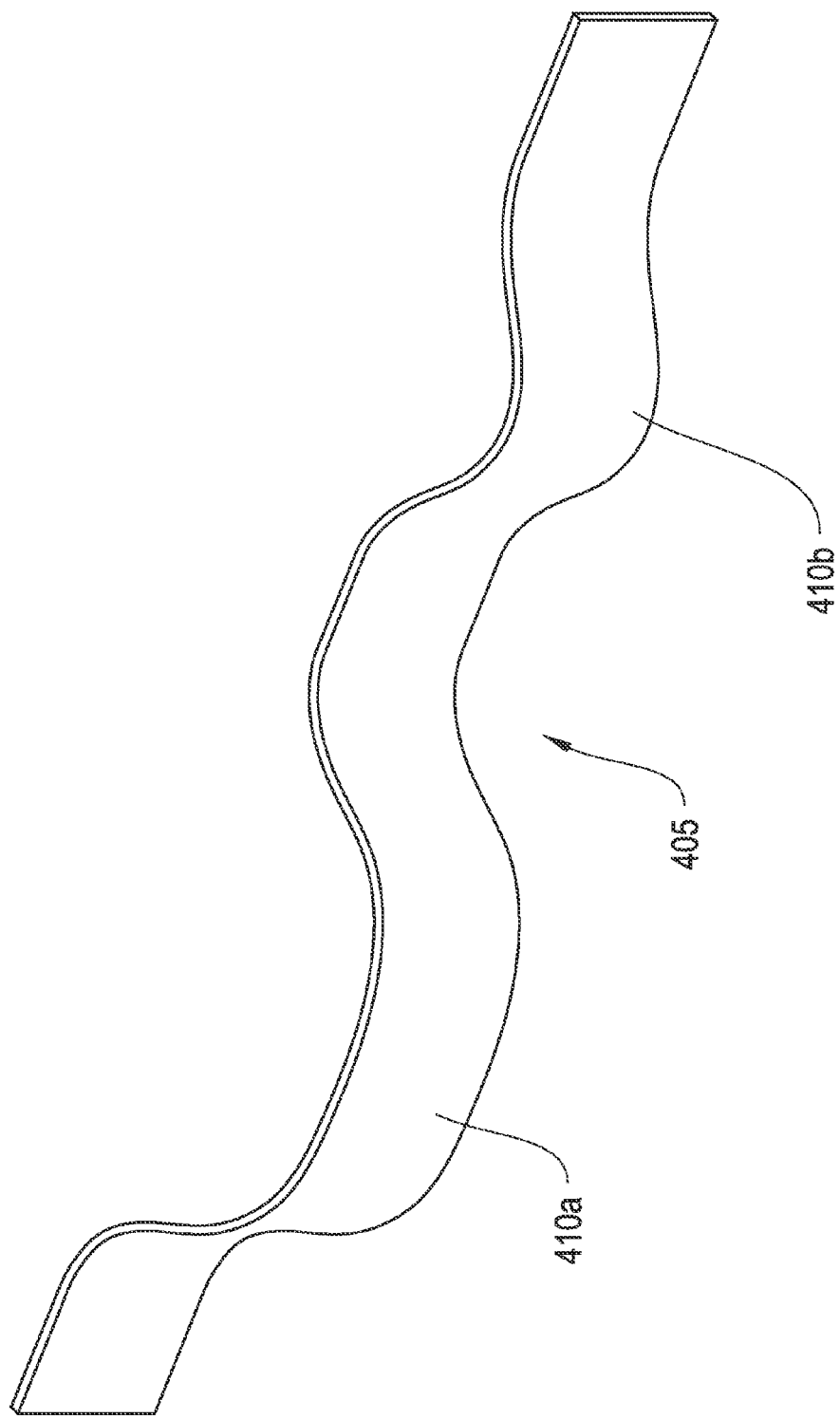

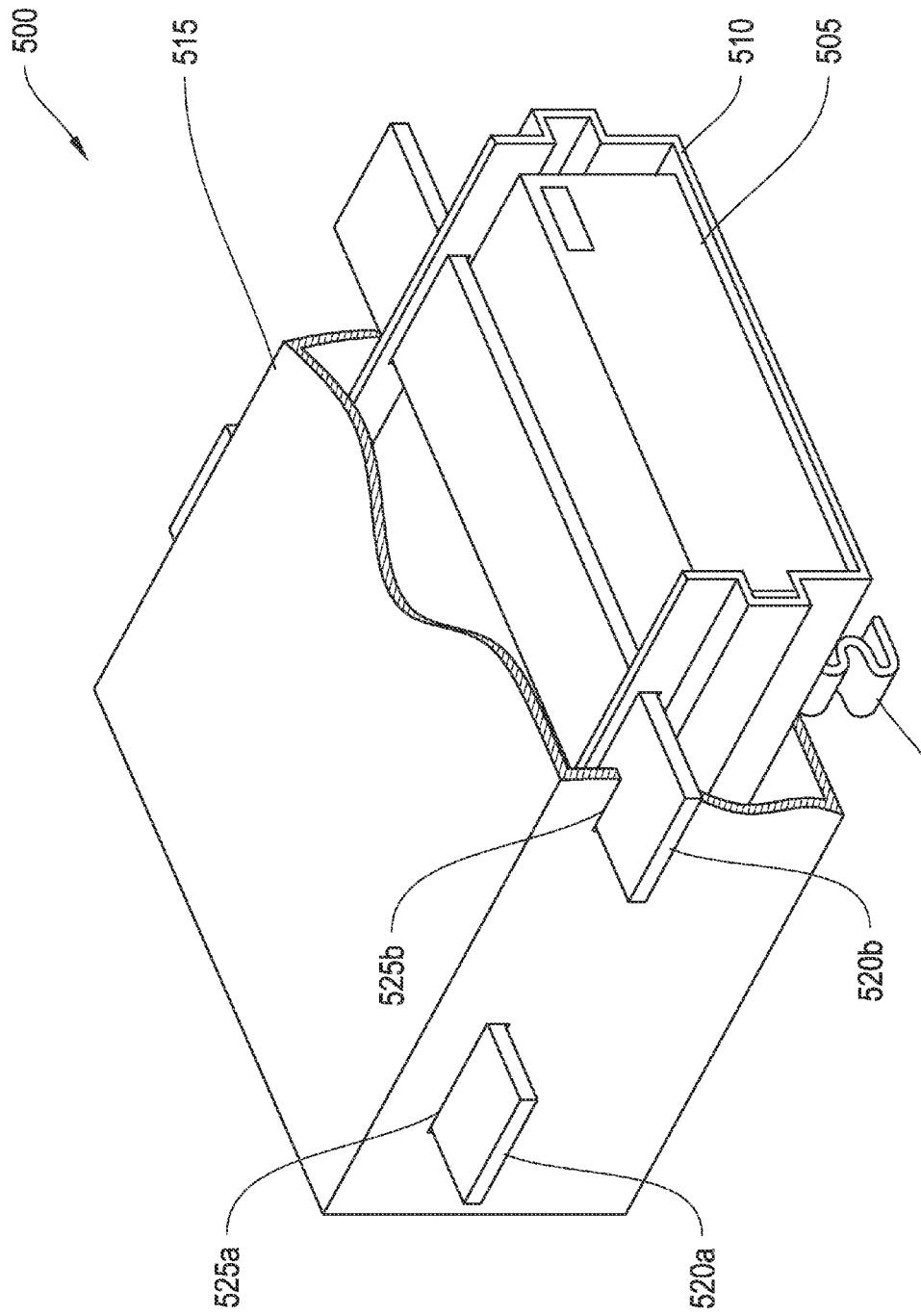

US 8,971,036 B1

HARD DISK DRIVE RETENTION

TECHNICAL INVENTION

The systems and methods described herein relate to retaining, and isolating from external sources of vibration, a hard disk drive within a computer system, and, particularly, to facilitating quick insertion and ejection of the hard disk drive from the computer system.

BACKGROUND

A hard disk drive (HDD) is a form of storage device that may be used in a computer system to store information. A hard disk drive is a form of non-volatile memory that uses a spinning magnetic disk, or platter, which is commonly driven at speeds of 5400 rpm or 7200 rpm, and onto which information is written using a moving read/write head, whereby information, in the form of bits, is stored by changing the magnetization of a thin ferromagnetic layer on top of the rotating disk using the movable head. In addition to one or more hard disk drives, the physical components that make up an individual computer system may include a plurality of processing cores for performing calculations related to the execution of code stored in memory, and for displaying graphical information to a human user of the system, a form of random access memory (RAM) that is generally cleared by a power cycle or other reboot operation (e.g., it is a "volatile" memory), communication devices, such as a network adapter having the mechanical, electrical and signaling circuitry needed to connect the individual computer system to a network of other computer systems, a data bus for connecting the components of the system, and a plurality of retention and structural elements used to house and protect the components, among others.

While alternative storage device technologies exist to hard disk drives (HDDs), such as solid state drives (SSDs) that employ arrays of semiconductor-based transistors to build memory blocks, large-scale storage systems employ HDDs due to their lower cost per unit storage space. As such, an array of spinning HDDs in a storage system may be a source of vibration, wherein vibration can damage components used to retain the HDDs, and generate noise. Furthermore, an external source of vibration from an array of spinning HDDs, or another source, which may include one or more system fans, may have an adverse effect on the performance of an HDD, and result in degradation and premature failure of an HDD.

There exist isolation systems to dampen vibration transmission from HDDs to other structures in a computer system, wherein an HDD and carrier assembly is suspended such that contact with the surrounding computer structure is through a spring and damper assembly. Securing an HDD in an isolation system requires tight fixation between the HDD casing and a carrier assembly to prevent vibration propagation from the casing to the carrier, since the isolation system only serves to inhibit propagation of vibration from the combined HDD and carrier assembly to the rest of the computer structure. Fixation between the HDD casing and the carrier assembly, in some embodiments of isolation systems, is achieved using screws. For large scale storage systems, which may require continuous replacement of a plurality of hard disk drives, the time to insert and extract a hard disk drive from an isolation system that uses fixation screws may be prohibitively long and cumbersome. As such, there is a need for a more efficient method of retaining a hard disk drive such that it may be inserted and extracted from a carrier assembly quickly, and held in position such that vibration between the hard disk drive casing and carrier assembly is reduced.

SUMMARY

The systems and methods described herein include, among other things, a hard disk drive (HDD) retention system, having an HDD carrier assembly into which an HDD is positioned, and which allows an HDD to be inserted and ejected quickly. The HDD casing is held within the carrier assembly by a spring force exerted by spring elements, wherein the spring force is generated by compression of the spring elements by a set of compression elements coupled to the HDD, and the spring force acts to reduce transmission of vibration between the HDD and the carrier assembly.

More particularly, the systems and methods described herein include a hard disk drive retention system that has a carrier assembly for receiving the hard disk drive, the carrier assembly having a pair of guide channels for receiving a pair of guide rails coupled to the hard disk drive, and the guide channels constraining relative motion of the hard disk drive and the carrier assembly in a first direction. The carrier assembly further has a pair of spring elements, which are compressed by spring compression elements on the guide rails, for exerting a force on the hard disk drive to resist motion between the hard disk drive and the carrier assembly in a second and a third direction.

In another aspect, the systems and methods described herein include a hard disk drive isolation system, which has a carrier assembly for receiving the hard disk drive, the carrier assembly having a pair of guide channels for receiving a pair of guide rails coupled to the hard disk drive, the guide channels constraining relative motion of the hard disk drive and the carrier assembly in a first direction. The hard disk drive is coupled to a pair of spring elements, which are compressed by spring compression elements coupled to the carrier assembly, for exerting a force on the hard disk drive to resist motion between the hard disk drive and the carrier assembly in a second and a third direction.

BRIEF DESCRIPTION OF THE DRAWINGS

The systems and methods described herein are set forth in the appended claims. However, for purpose of explanation, several embodiments are set forth in the following figures.

FIGS. 3A, 3B, 3C, and 3D depict implementations of illustrative guide rails;

FIGS. 4A and 4B depict implementations of illustrative spring elements; and

FIG. 5 depicts an HDD retention system using structural elements to immobilize an isolation system.

DETAILED DESCRIPTION

In the following description, numerous details are set forth for the purpose of explanation. However, one of ordinary skill in the art will realize that the embodiments described herein may be practiced without the use of these specific details, and that these details are not essential and that the hard disk drive retention systems described herein may be modified and altered as appropriate to address the application.

In one embodiment, the systems and methods described herein include, among other things, a hard disk drive (HDD) retention system that has an HDD carrier assembly into which an HDD is positioned, and which allows for facile insertion and ejection of an HDD. Attached to the HDD casing are a first guide rail and a second guide rail, wherein the first guide rail slides into a first guide channel and the second guide rail slides into a second guide channel of the HDD carrier assembly. The HDD casing is held within the carrier assembly by a spring force exerted by a first spring element and a second spring element, wherein the spring force is generated by compression of the first spring element and the second spring element by a first set of compression elements on the first guide rail and a second set of compression elements on the second guide rail, respectively.

Figure 1A:
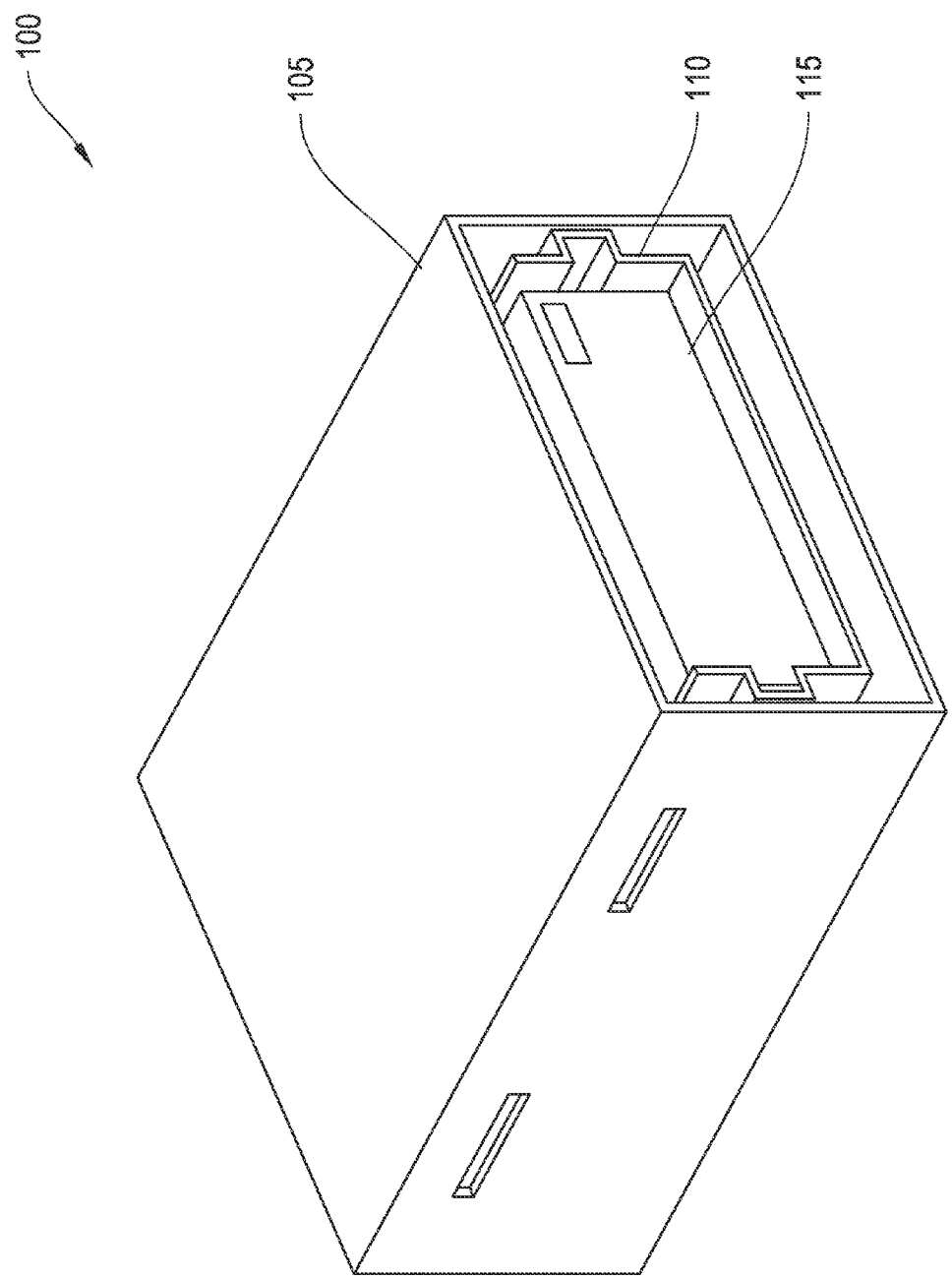
FIGS. 1A and 1B depict an HDD retention system.
Figure 1B:
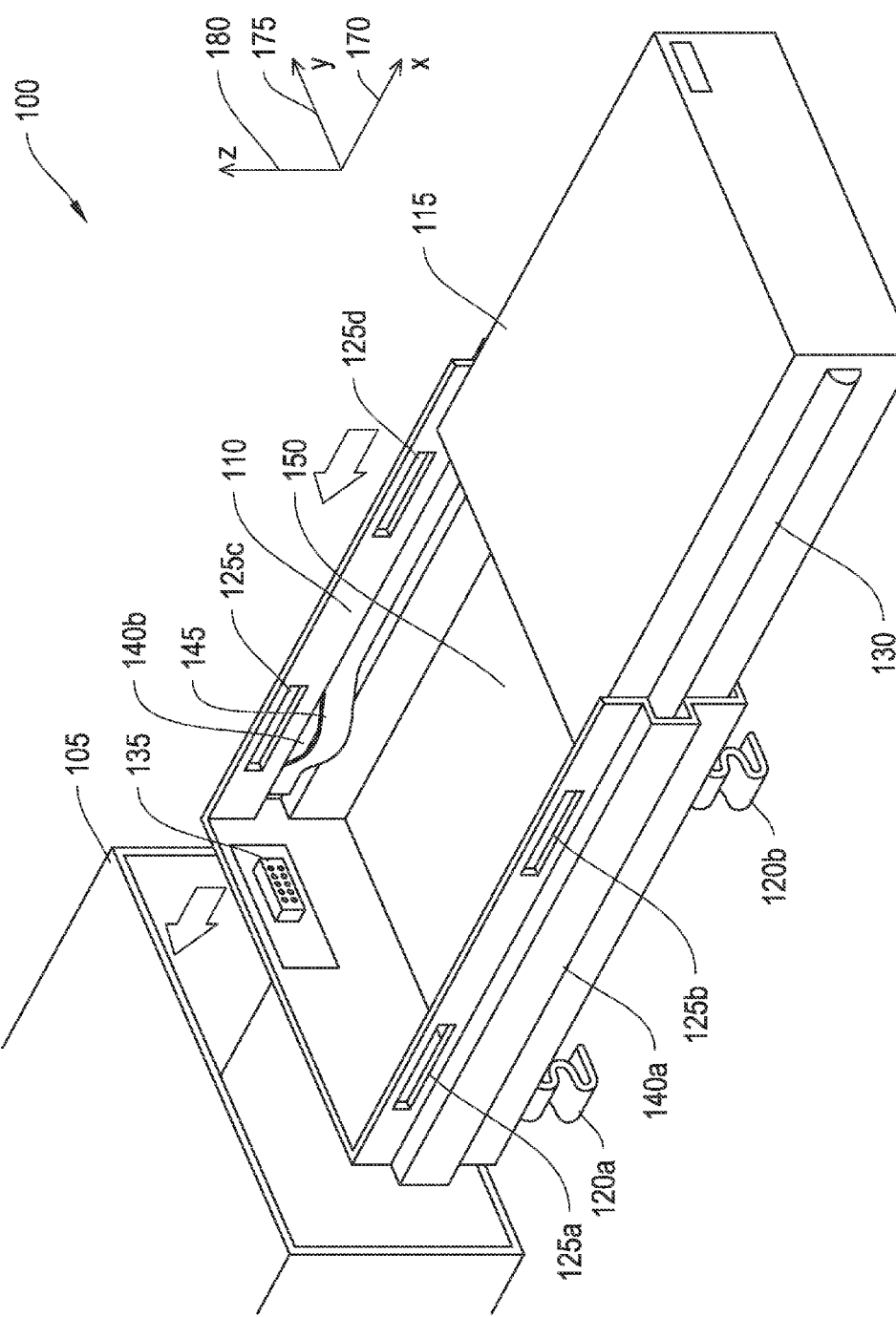

FIGS. 1A and 1B depict an HDD retention system 100. In particular, FIG. 1A depicts the HDD retention system 100, composed of a computer superstructure 105, carrier assembly 110, and HDD 115. The computer superstructure 105 is a part of a computer system, wherein the computer system is made up of a plurality of different hardware components, one or more of which may be an HDD 115. In order to fix the components in position, in addition to offering protection to the fragile electronics from excessive temperature variations, moisture, light, and other sources of interference, the computer system is made up of various structural elements. Computer superstructure 105 represents those structural elements designed to house an HDD 115. The HDD 115 may be one of a group of HDDs within a single computer case or rack. The depicted computer superstructure 105 is a schematic representation of the structural elements surrounding a single HDD 115. The computer superstructure 105 takes the geometric form of an open-ended box in FIG. 1A, but it will be readily apparent to those of skill in the art that the depicted embodiment should not limit the scope of what constitutes a computer superstructure 105, wherein the computer superstructure 105 may be constructed using a plurality of solid plates, or may, alternatively, be constructed using a plurality of rods, brackets, or any structural members capable of being joined together to form a supportive structure for an HDD 115 and carrier assembly 110 combination. The computer superstructure 105 may have a grill or vent pattern integrated into its structural elements to allow for air circulation to cool the electronic components held within, and the materials used in the computer superstructure 105 may be metallic or polymer-based, or any material capable of providing the mechanical strength and rigidity necessary to form a supportive structure for the combination of HDD 115 and carrier assembly 110.

FIG. 1B depicts the HDD retention system of FIG. 1A, wherein the carrier assembly 110, and the HDD 115 are depicted spaced apart from the computer superstructure 105. Specifically, FIG. 1B depicts the carrier assembly 110 with two guide channels 140a and 140b, four immobilization mechanism channels 125a-125d, an HDD connector 135, a spring element 145, and two external isolation system elements 120a and 120b. Also depicted is HDD 115 with a guide rail 130.

The HDD 115 is held within the carrier assembly 110 such that vibration propagation between HDD 115 and carrier assembly 110 is reduced. In one implementation, the HDD 115 slides into the carrier assembly 110 such that the depicted guide rail 130 slides into guide channel 140a. When the HDD 115 is fully inserted into the carrier assembly 110, the spring element 145 is compressed such that a spring force is exerted on the sides of the HDD 115. In one embodiment, contact between the guide rail 130 and the guide channel 140a prevents the HDD 115 from moving in the z-direction 180. In another embodiment, the HDD 115 is supported by the carrier base 150 such that solid contact between the HDD 115 and carrier base 150 prevents motion in the z-direction 180. The spring force exerted by the spring element 145 on the HDD 115 holds the HDD 115 within the carrier assembly 110, and prevents motion of the HDD 115 in the x- and y-directions 170 and 175, respectively.

In this implementation, an HDD 115 represents a source of vibration, wherein the vibration may be the result of an eccentricity in the spinning magnetic disk, or disks, within the HDD 115, and wherein some of the electrical energy input to the HDD 115 to spin the magnetic disk, or disks, is converted to vibrational kinetic energy. The vibration may be transmitted from the HDD 115 through any solid and rigid element connected to the HDD 115, wherein vibration is most efficiently transmitted through a solid object. Generally, a spring element, as opposed to a rigid element, may be used to reduce transmission of vibrational energy. Although not to be bound by theory, for the purpose of explanation only, it is noted that one of ordinary skill in the art will appreciate that a simple mechanical system, such as the system formed by the HDD 115, carrier assembly 110, and spring element 145, may be modeled as a spring and mass and damper system. It is further noted that in the description that follows, the term "spring" refers to an element that has a designed stiffness and preload that may reduce vibration transmission when coupled, or sandwiched, between two other elements, such as between an HDD 115 and a carrier assembly 110. Furthermore, one of ordinary skill in the art will appreciate that while no explicit damper element may be included in the implementations herein, the connection of any spring element to any body may rightly be referred to as a spring and mass and damper system, or spring-mass-damper system, wherein any real spring and mass system subject to friction forces from solid contact between two loosely-coupled bodies, or from a fluid, wherein a fluid may commonly refer to a liquid or gas such as water or air, includes some amount of inherent damping, or energy dissipation.

Given a general spring-mass-damper system, wherein a spring element is used to reduce transmission of vibrational energy, there exists a damped natural frequency of vibration at and around which vibration is amplified. Below this damped natural frequency, vibration may be transmitted but not amplified, and above this damped natural frequency, the vibration transmission is reduced, wherein the vibration transmission progressively decreases as the vibration frequency moves to progressively higher frequencies above the damped natural frequency.

It is noted that vibration is generally undesirable in a mechanical system. While a source of vibration, such as HDD 115, may be designed to tolerate a source of internal vibration without damage, it is undesirable to allow vibration to propagate beyond its source. In one implementation, an HDD 115, despite itself being a source of vibration, may be susceptible to performance deterioration and premature failure due to an externally-applied source of vibration. Within a data center, a single HDD 115 may be one of an array of tens or hundreds of similar hard disk drives, and vibration from an external hard disk drive, or from an array of hard disk drives, if allowed to propagate to a given HDD 115, may eventually result in damage to the HDD 115. In another implementation, the HDD 115 may be part of a large array of hundreds of similar hard disk drives in a server, and vibration may cause partial or complete failure of mechanical couplings between respective hard disk drives and a computer superstructure, such as computer superstructure 105. Additionally, vibration, once transmitted between a solid body and the surrounding air, may be a source of noise. As such, external isolation system elements 120a and 120b are representative of components used in an isolation system that is separate to the HDD retention system 100 described herein. The HDD retention system 100 accommodates separate, external isolation systems by providing mounting points/brackets for isolation elements, including the depicted isolation system elements 120a and 120b, on the carrier assembly 110. This external isolation system reduces transmission of vibration from the carrier assembly 110 to the computer superstructure 105, wherein the external isolation system elements 120a and 120b, in combination with other external isolation system elements that are not shown and not part of the implementation herein, may be designed to have a damped natural frequency, or isolation frequency of around 30 Hz, and wherein 30 Hz is chosen such that the source of vibration, which in this implementation may be the HDD 115 spinning at 90 Hz, is sufficiently above the damped natural frequency, which will result in vibration transmission from the carrier assembly 110 to the computer superstructure 105 being reduced.

In addition to holding the HDD 115 in the carrier assembly 110 such that movement in the x-direction 170 and y-direction 175 is restricted, the depicted spring element 145 is part of a retention system designed to form a spring-mass-damper system to reduce vibration transmission from the HDD 115 to the carrier assembly 110, and such that the retention system may also be referred to as an isolation system. The retention system is designed with a damped natural frequency between the lowest expected driving frequency of vibration, which is 90 Hz sourced at the HDD 115, and the 30 Hz isolation frequency associated with the external isolation system, of which external isolation system elements 120a and 120b are a part, and which are separate to the implementation described herein. As such, the retention system is designed with a damped natural frequency that may be between 45 Hz and 60 Hz, wherein the driving frequency of vibration, which is the 90 Hz from HDD 115, is above the damped natural frequency of between 45 Hz and 60 Hz, and which results in reduced vibration transmission. The retention system, including the spring element 145, is designed such that the physical properties, including the shapes, masses and the spring constants associated with the elements that make up the retention system, combine to have a damped natural frequency that may be between 45 Hz and 60 Hz. However, it should be apparent that the design of the HDD retention system 100 can be modified such that these frequencies will change, without departing from the spirit of the implementations described herein. For instance, the source of vibration, instead of being at 90 Hz, may be 120 Hz, and the stiffness, geometry, and weight of the retention system, including spring element 145, may remain such that the retention system has a damped natural frequency between 45 Hz and 60 Hz, or may be adjusted to have, in one implementation, a damped natural frequency between 60 Hz and 80 Hz, among others.

HDD 115 is depicted as a high-capacity drive for use inside a computer superstructure 105. Hard disk drives are classified according to capacity, physical size, rotational speed, connection type, and casing type. In relation to physical size, three categories of hard disk drive are commonly used, and named according to the approximate diameter of the storage disk, wherein these three categories include 3.5 inch (3.5"), 2.5 inch (2.5"), and 1.8 inch (1.8"). Hard disk drive rotation speeds include 4800, 5400, 7200, 10000, and 15000 rpm. The storage capacity of a hard disk drive can range up to 4 terabytes (TB), with this capacity ever-increasing as manufacturing techniques improve. An external hard disk drive has a casing that is designed to be used outside of a computer superstructure 105, wherein an external hard disk drive contains an internal hard disk drive with an extra casing layer. A hard disk drive may use one of a variety of connection technologies to facilitate transmission of data and power. These connection technologies include SATA, PATA, ESDI, ST-412, ST-506, SAS, SCSI, and SASI. HDD connector 135 accommodates a friction-fit connection compatible with one of the aforementioned connection technologies.

The carrier assembly 110 is constructed such that the HDD 115 may be inserted and removed without the use of fixation means such as screws and clips, thereby reducing the time to eject and insert the HDD 115. The guide rail 130 on the HDD 115 is positioned into the guide channel 140a such that a data connection on the HDD (not shown) is aligned with the HDD connector 135 on the carrier assembly 110, and whereby pushing the HDD 115 into the carrier assembly 110 forms a friction fit between the data connection on the HDD (not shown) and the HDD connector 135, allowing power and data communications to be transmitted between the HDD 115 and a larger computer system of which the HDD 115 is a component. The HDD 115 is retained within the carrier assembly 110 by a spring force generated by spring elements, such as spring element 145, and whereby screw, clip, or similar fixation means is not necessary for retention of the HDD 115. HDD connector 135 may be loosely coupled to the carrier assembly 110 such that it can move in the z-direction 180 and y-direction 175 from an equilibrium position, thereby accommodating slight misalignment as the HDD 115 is pushed into the carried assembly 110. The loose coupling may be constructed by having the HDD connector 135 connected to the carrier assembly 110 by flexible wires to transfer power and data to the HDD 115. The loose coupling of the HDD connector 135 to the carrier assembly 110 may allow movement of the HDD connector 135 in the y-direction 175 and z-direction 180 from an equilibrium position by, in one embodiment, +/−2.5 mm from equilibrium.

The carrier assembly 110 is depicted in FIG. 1B as a box structure. It is noted, however, that the embodiment of the carrier assembly 110 should not be limited to the box structure shown, and those of skill in the art will be able to conceive of numerous alternative designs, without departing from the spirit of the embodied carrier assembly 110. The carrier assembly 110 may be constructed using a plurality of solid plates, a single stamped and folded form, or may alternatively be constructed using a plurality of rods, brackets, or any structural members capable of being joined together to form a supportive structure for an HDD 115. The carrier assembly 110 may have a grill or vent pattern integrated into its structural elements to allow for air circulation to cool the electronic components held within, and the materials used in the carrier assembly 110 may be metallic or polymer-based, or any material capable of providing the mechanical strength and rigidity necessary to form a supportive structure for the HDD 115.

Large scale storage systems commonly use 3.5" HDDs, such as HDD 115 in FIG. 1B, which are driven at 5400 or 7200 rpm. However, is should be apparent to those of skill in the art that the depicted HDD retention system 100 could be adapted to other types hard disk drives, and the retention system created by the spring element 145 configured to rotational frequencies other than the 90 Hz or 120 Hz corresponding to 5400 and 7200 rpm, respectively.

Figure 2A:
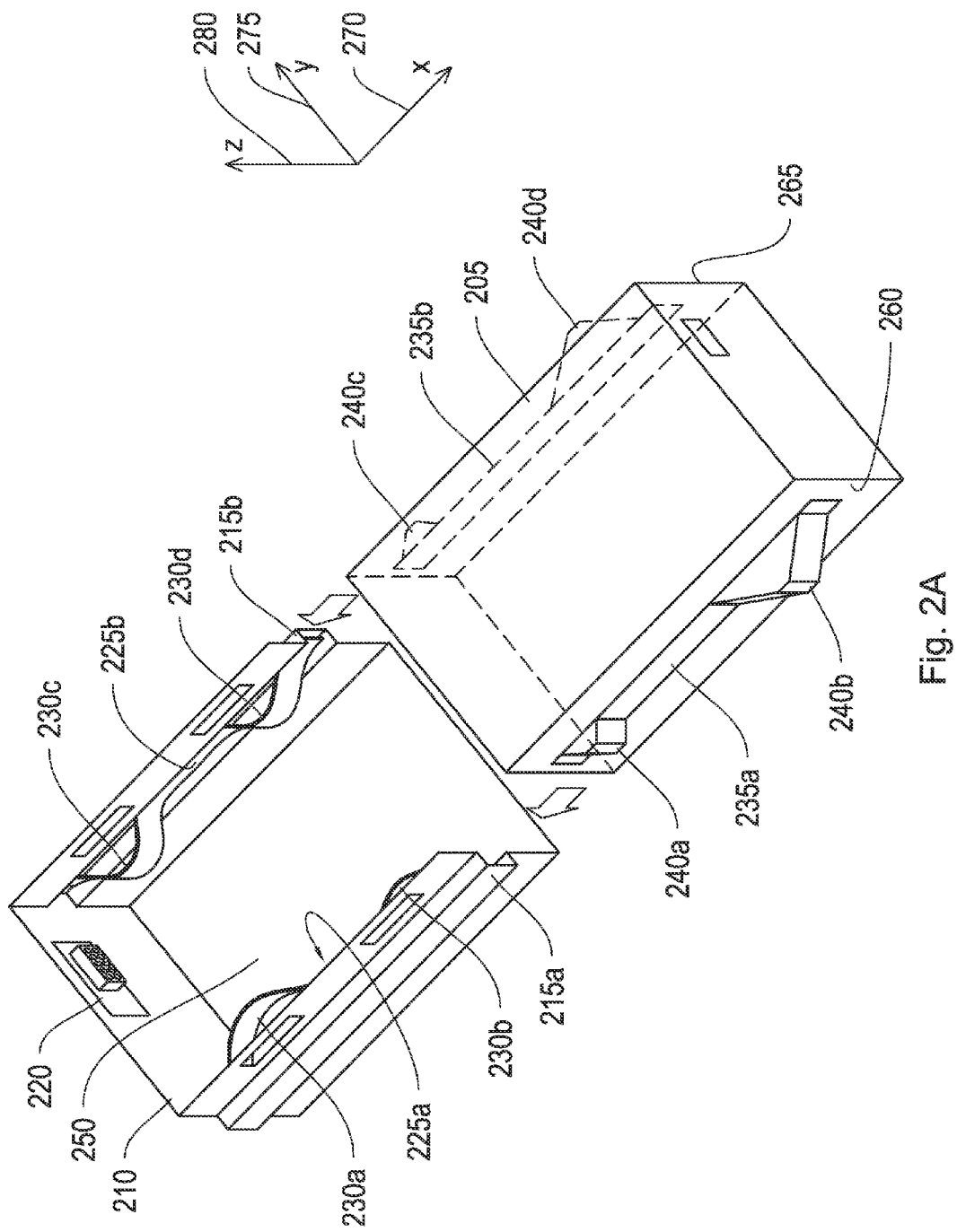
FIGS. 2A and 2B depict views of an HDD being inserted into a carrier assembly.

FIG. 2A depicts a view of an HDD 205 spaced apart from a carrier assembly 210. More particularly, FIG. 2A depicts a carrier base 250, two guide channels 215a and 215b, HDD connector 220, two spring elements 225a and 225b, four flexure regions 230a-230d, two guide rails 235a and 235b, and four contact surfaces, referred to as spring compression elements 240a-240d. In the depicted implementation, a first spring element 225a has a first flexure region 230a and a second flexure region 230b, and a second spring element 225b has a first flexure region 230c and a second flexure region 230d. For both the first spring element 225a and second spring element 225b, the first flexure region 230a and first flexure region 230c are formed such that they project out from the carrier assembly chassis to a greater extent than the second flexure region 230b and the second flexure region 230d, respectively. A first guide rail 235a has a first spring compression element 240a and a second spring compression element 240b, and a second guide rail 235b has a first spring compression element 240c and a second spring compression element 240d, such that first spring compression elements 240a and 240c project out from the HDD casing to a lesser extent than the second spring compression elements 240b and 240d, respectively.

When inserted into the carrier assembly 210, spring compression element 240a does not make contact with flexure region 230b, but does depress flexure region 230a. The same is true for spring compression element 240c, which does not make contact with flexure region 230d, but does depress flexure region 230b. Furthermore, the spring compression element 240b depresses flexure region 230b, and spring compression element 240d depresses flexure region 230d. In other implementations of the depicted system, the four spring compression elements 240a-240d, and the four flexure regions 230a-230b may extend from the HDD 205 casing and carrier assembly 210 casing to the same extents, respectively.

Due to the compression of flexure regions 230a-230d by spring compression elements 240a-240d, spring forces are exerted on a first side 260, and a second side 265 of the HDD 205. The spring forces have components such that the HDD 205 is constrained in both the x-direction 270, and y-direction 275, and the spring elements 225a and 225b are designed such that they do not permit certain vibration ranges to transmit between carrier assembly 210 and HDD 205, wherein the spring elements 225a and 225b setup a spring-mass-damper system with low damping ratio, and wherein the damped natural frequency of the system is, in one embodiment, below a range of 45-60 Hz, such that transmission of vibrational frequencies within the 45-60 Hz range from the HDD 205 to the carrier assembly 210 is reduced.

In one implementation, the carrier assembly 210 allows for improved thermal management of the HDD 205. The carrier base 250 may be constructed from a metal plate, with or without integrated openings for ventilation. The design of the spring elements 225a and 225b, in combination with the guide rails 235a and 235b, may be such that a component of a spring force pushes the HDD 205 into contact with the carrier base 250. The carrier base 250, when in contact with the HDD 205, may act as a heat sink, and allow for increased heat transfer away from the HDD 205.

Figure 2B:
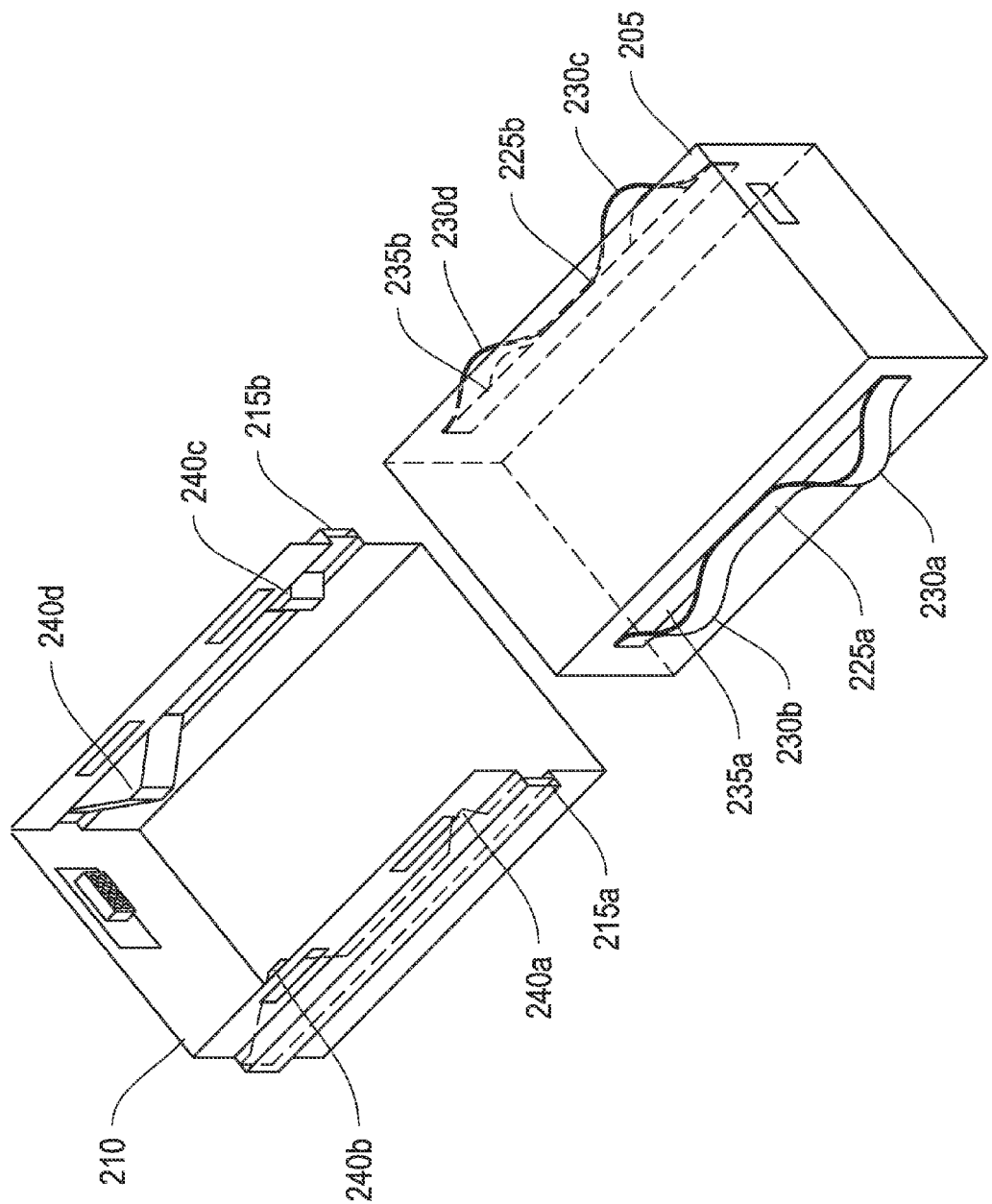

FIG. 2B depicts an alternative implementation of the system of FIG. 2A, wherein the first spring element 225a (including first flexure region 230a and second flexure region 230b) is coupled to the first guide rail 235a on HDD 205, and the second spring element 225b (including first flexure region 230c and second flexure region 230d) is coupled to the second guide rail 235b on HDD 205. Furthermore, spring compression elements 240a and 240b are coupled to guide channel 215a on carrier assembly 210, and spring compression elements 240c and 240d are coupled to guide channel 215b on carrier assembly 210. In other respects, the operation of the system depicted in FIG. 2B is similar to that described in relation to FIG. 2A.

FIG. 3A depicts one implementation of a guide rail 305. In particular, guide rail 305 has a first spring compression element 315a, and a second spring compression element 315b, three pegs 310a-310c, and a grip 320. Both the first spring compression element 315a and second spring compression element 315b are shaped to allow a spring element to be compressed upon sliding into an HDD into a carrier assembly. In particular, surface 350 on spring compression element 315a is shaped to slope from a surface 360 of the guide rail 305 to a surface 352, and surface 350 may be flat, as depicted, or curved, without departing from the scope of the implementation. Surface 350 will make contact with a spring element, such as flexure region 230a from FIG. 2A. As the guide rail 305 is moved in relation to the spring element, such as when HDD 205 slides into carrier assembly 210 in FIG. 2A, the spring element will gradually be compressed as it moves in relation to guide rail 305, wherein its point of contact moves along surface 350 towards surface 352. At the point of contact of surface 352 and a spring element, such as flexure region 230a from FIG. 2A, the spring element is compressed to the extent intended by the design of the implementation, and a resulting spring force is applied to surface 352. Surface 352 is parallel to surface 362, and, hence, parallel to a side of the HDD to which it is attached, such as side 260 of HDD 205 from FIG. 2A. In this way, the force applied by the spring element is perpendicular to the surface to which guide rail 305 is attached, which may be a force perpendicular to surface 260 from FIG. 2A.

Similarly, surface 356 on spring compression element 315b is shaped to slope from a surface 360 of the guide rail 305 to a surface 358, and surface 356 may be flat, as depicted, or curved, without departing from the scope of the implementation, and wherein, if flat, the slope of surface 356 may or may not be the same as that slope of surface 350 of first spring compression element 315a. Surface 356 will make contact with a spring element, such as flexure region 230b from FIG. 2A. As the guide rail 305 is moved in relation to the spring element, such as when HDD 205, slides into carrier assembly 210 in FIG. 2A, the spring element will gradually be compressed as it moves in relation to guide rail 305, wherein its point of contact moves along surface 356 towards surface 358. At the point of contact of surface 358 and a spring element, such as flexure region 230b from FIG. 2A, the spring element is compressed to the extent intended by the design of the implementation, and a resulting spring force is applied to surface 358. Surface 358 is curved to match the curvature of a spring element, such as flexure region 230b from FIG. 2A, wherein the curvature of surface 358 results in the spring element having several points of contact, and, hence, the spring force from the compression of the spring element to have more than one component, where before, for the first spring compression element 315a, the spring force only had a component perpendicular to a side of the HDD, such as side 260 of HDD 205 from FIG. 2A. For the second spring compression element 315b, there will be a component of the spring force perpendicular to surface 362 of the guide rail 305, which may be equivalent to a component perpendicular to surface 260 of HDD 205 from FIG. 2A, in addition to a component parallel to surface 362, and equivalent to a component parallel to the x-direction 270 from FIG. 2A.

The first spring compression element 315a is shaped such that it projects out from the guide rail body to a lesser extent that the second spring compression element 315b, but in another implementation, the guide rail 305 may have a first spring compression element 315a and second spring compression element 315b of equal size, or may have more than two spring compression elements 315a and 315b.

Pegs 310a-310c allow the guide rail 305 to be coupled to the casing of an HDD, where the size and spacing of pegs 310a-310c correspond to the standardized screw hole size and spacing on an HDD case, and form an interference fit with the screw holes on an HDD case. In another implementation, the guide rail 305 may only have two pegs to couple guide rail 305 to an HDD case. Grip 320 allows an HDD to be pulled out of, or pushed into, a carrier assembly.

The guide rail 305 may, in one implementation, be formed as an injection molded-plastic, or it may be formed from a stamped metal plate, or any other material or means to create a guide rail 305 with the strength and hardness to support the forces involved in sliding and holding an HDD in a carrier assembly. The HDD onto which the guide rail 305 affixes will, in one implementation, be a 3.5" HDD, but it will be readily apparent to those of skill in the art that the guide rail 305 can be adapted for use on HDDs of different sizes, and the size and spacing of the pegs 310a-310c changed to match the size and spacing of screw holes on an HDD of different size.

Figure 3B:
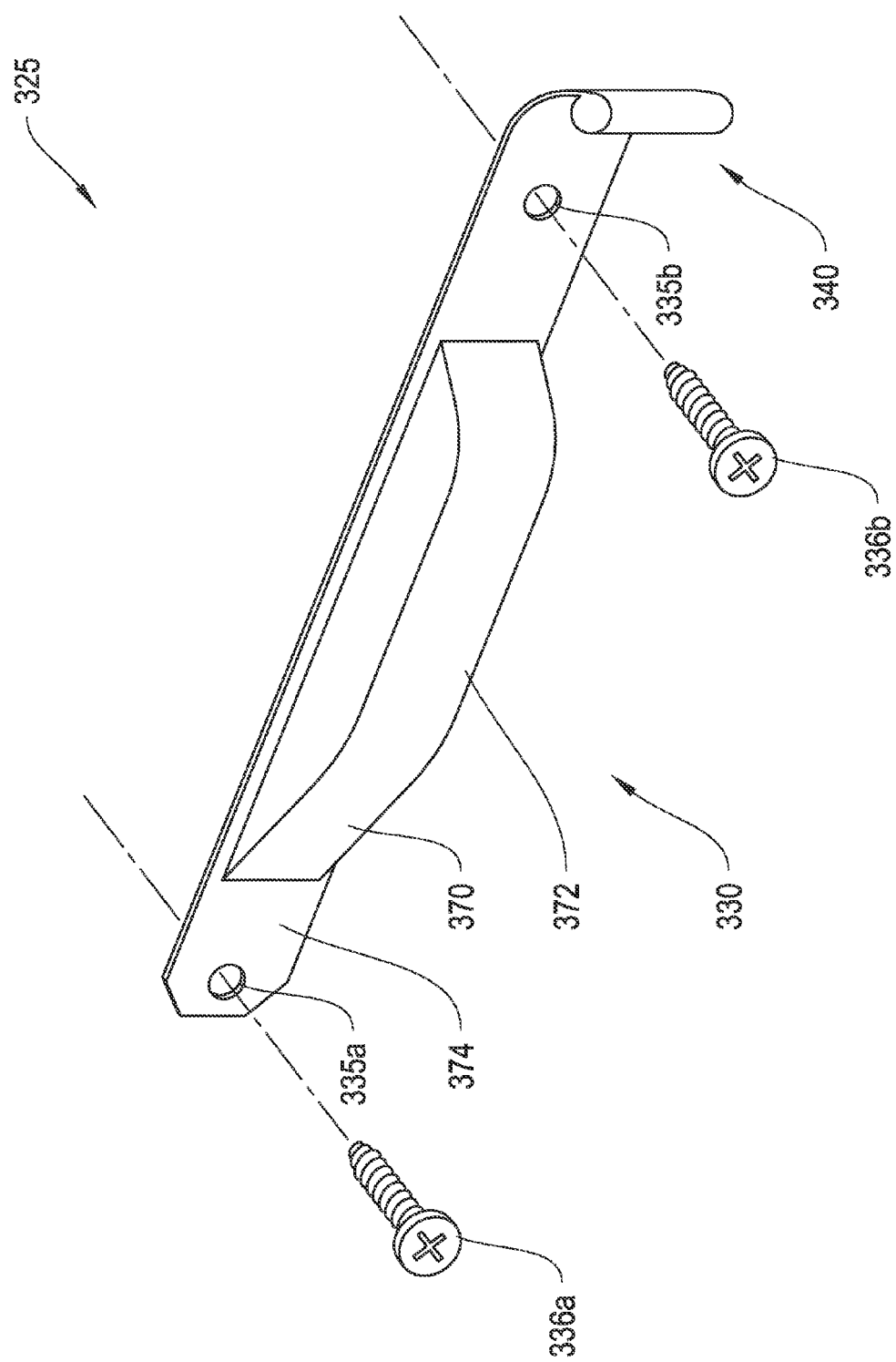

FIG. 3B depicts another implementation of a guide rail 325. In particular, FIG. 3B depicts a guide rail 325 which has a first screw hole 335a, and a second screw hole 335b, a grip 340, and a spring compression element 330. The depicted implementation uses screws 336a and 336b to couple the guide rail 325 to an HDD case instead of the pegs 310a-310c from FIG. 3A. The depicted guide rail 325 also uses a single spring compression element 330 to extend out from the side of an HDD case and to engage one or more spring elements on the carrier assembly. Surface 370 on spring compression element 330 is shaped to slope from a surface 374 of the guide rail 325 to a surface 372, and surface 370 may be flat, as depicted, or curved, without departing from the scope of the implementation. Surface 370 will make contact with a spring element, such as flexure region 230a from FIG. 2A. As the guide rail 325 is moved in relation to the spring element, such as when HDD 205 slides into carrier assembly 210 in FIG. 2A, the spring element will gradually be compressed as it moves in relation to guide rail 325, wherein its point of contact moves along surface 370 towards surface 372. At the point of contact of surface 372 and a spring element, such as flexure region 230a from FIG. 2A, the spring element is compressed to the extent intended by the design of the implementation, and a resulting spring force is applied to surface 372. Surface 372 is parallel to surface 374, and hence, parallel to a side of the HDD to which guide rail 325 is attached, such as side 260 of HDD 205 from FIG. 2A. This geometry results in the force applied by the spring element on the surface 372 being perpendicular to the surface to which guide rail 305 is attached, which may be a force perpendicular to surface 260 from FIG. 2A.

FIG. 3C is another implementation of a guide rail 380. In particular, FIG. 3C depicts a guide rail 380 that may be used to press an HDD, such as HDD 205 from FIG. 2A, into contact with a carrier base 250 to improve heat transfer away from the electronic components in the HDD 205. Guide rail 380 has a first spring compression element 384, a second spring compression element 386, a grip 396, and two pegs 392 and 394, wherein the geometry of pegs 392 and 394 corresponds to the standardized screw hole size and spacing on an HDD case, and the pegs 392 and 394 can form an interference fit with the screw holes on an HDD case. FIG. 3D depicts an end view of the guide rail 380 from FIG. 3C.

The first spring compression element 384 is shaped such that it projects out from the guide rail body to a lesser extent that the second spring compression element 386, but in another implementation, the guide rail 380 may have a first spring compression element 384 and second spring compression element 386 of equal size, or may have only a single compression element, or more than two spring compression elements.

Surface 388 of the first spring compression element 384 is sloped such that when attached to an HDD, such as HDD 205 from FIG. 2A, and when in contact with a spring, such as flexure region 230a from FIG. 2A, a component of a spring force pushes the HDD 205 against the carrier base 250 in the z-direction 280, thereby improving thermal contact between the HDD 205 and the carrier base 250. Similarly, surface 390 of the second spring compression element 386 is sloped such that then when attached to HDD 205 and in contact with a spring, such as flexure region 230b, a resultant component of the spring force in the z-direction 280 pushes HDD 205 into contact with the carrier base 250 for increased thermal conductivity.

FIG. 4A depicts one implementation of a spring element 405, for use in the carrier assembly depicted in FIG. 1B. Spring element 405 has a first flexure region 410a, and a second flexure region 410b, and spring element 405 may be referred to as a leaf spring. The spring element 405 may be a single workpiece, constructed from a stamped and shaped metal plate, such as steel or aluminum, or formed from another material with the mechanical properties that allow flexure regions 410a and 410b to elastically deform, and exert resistive spring forces in opposition to the insertion of an HDD into a carrier assembly. The spring element 405 is coupled to a carrier assembly using any conventional means, such as a compression fit, riveting or screwing, and the depicted implementation has a first flexure region 410a that is larger than a second flexure region 410b, but in another implementation, both the first flexure region 410a and second flexure region 410b may have the same shape and there may alternatively be a single flexure region, or three or more flexure regions in place of the two depicted flexure regions (410a and 410b).

Figure 4B:
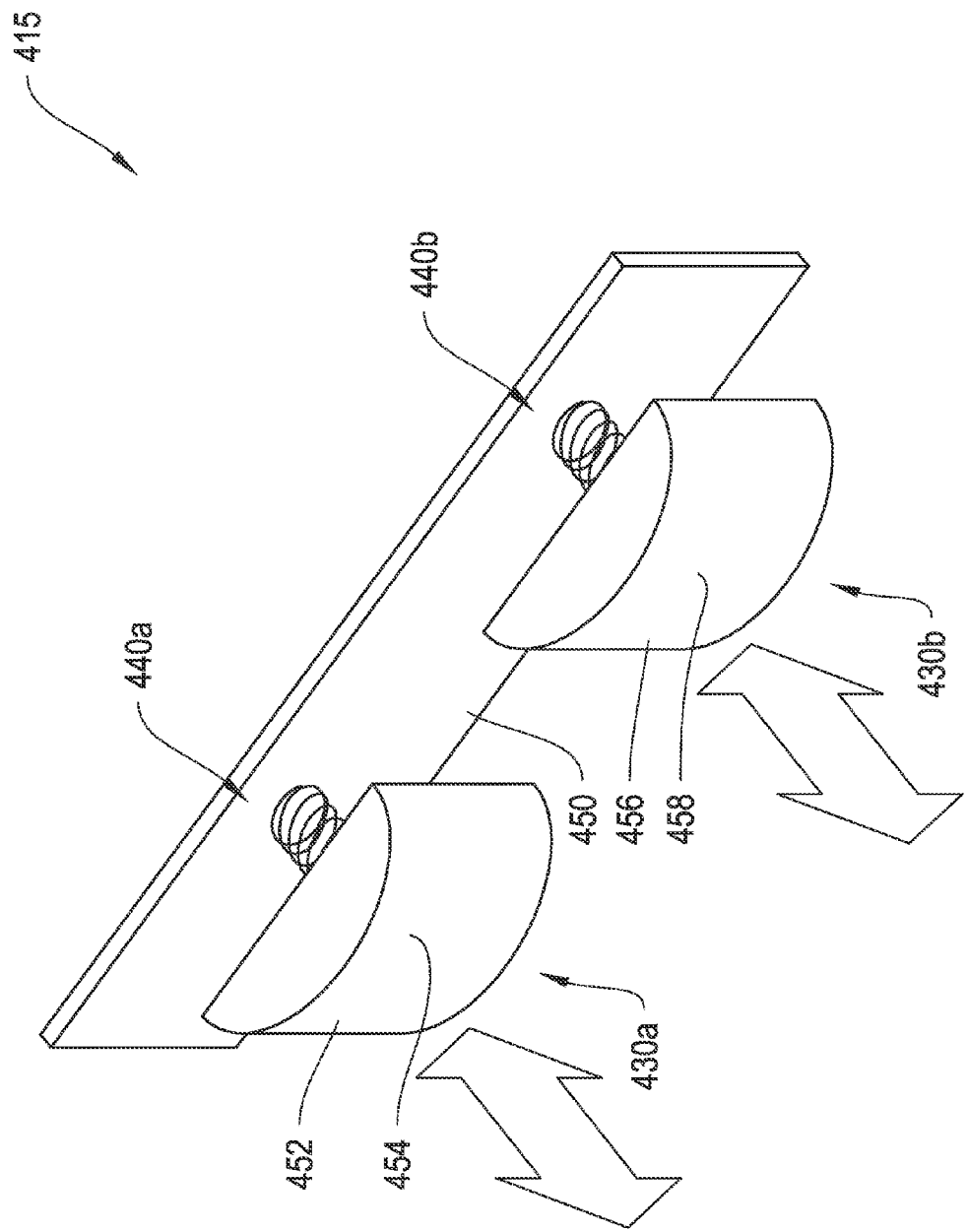

FIG. 4B depicts an alternative implementation of a spring element 415 for use in a carrier assembly to retain an HDD. In particular, FIG. 4B depicts a spring element 415 which has a first plunger element 430a, and a second plunger element 430b. The first plunger element 430a, and a second plunger element 430b are attached to a base surface 450, by a first spring 440a and a second spring 440b, respectively, and wherein the base surface 450 may attach to a carrier assembly, such as carrier assembly 210 from FIG. 2A, by any conventional means, such as a compression fit, riveting or screwing, and wherein base surface 450 may be constructed from, among others, a stamped metal plate, or injection molded plastic. Springs 440a and 440b may be of a conventional coiled metal spring design, and the plunger elements 430a and 430b may be, in one implementation, molded plastic or rubber pieces.

Surface 452 on spring element 415 is shaped to make contact with a spring compression element, such as spring compression element 330 from FIG. 3B, and such that a spring compression element in contact with surface 452 will exert a force to move plunger element 430a and compress spring 440a. At the point of contact of surface 454 and a spring compression element, spring 440a is compressed to the extent intended by the design of the implementation, and a resulting spring force is transmitted though the point of contact, or surface of contact, of surface 454 and the spring compression element. Similarly, surface 456 of plunger element 430b is shaped to slope to a surface 458. At the point of contact of surface 458 with a spring compression element, spring 440b is compressed to the extent intended by the design of the implementation, and a resulting spring force is transmitted through the point of contact, or surface of contact, between surface 458 and the contacting surface on a spring compression element.

FIG. 5 depicts an HDD retention system 500 using structural elements to immobilize a separate isolation system. In particular, FIG. 5 depicts an HDD retention system 500, an HDD 505, a carrier assembly 510, a computer superstructure 515, two immobilization mechanism struts 520a and 520b, an external isolation system element 530, and two immobilization mechanism channels 525a and 525b. The HDD retention system 500 accommodates separate, external, isolation systems by providing mounting points/brackets for isolation elements, including the depicted external isolation system element 530, on the carrier assembly 510. Such an external isolation system impedes transmission of vibration from the combination of HDD 505 and carrier assembly 510 to the computer superstructure 515, such that, in one implementation, vibration frequencies above 30 Hz are absorbed from transmission. Isolation elements, such as external isolation element 530 act essentially as flexible springs, and are the only points of contact between the carrier assembly 510 and computer superstructure 515, such that vibration absorption is achieved by allowing the combination HDD 505 and carrier assembly 510 to move relative to the computer superstructure 515.

In some instances, it is desirable to prevent relative motion between the combined HDD 505 and carrier assembly 510 and the computer superstructure 515, such as when the computer containing the HDD 505 is being moved. In order to prevent motion of the internal components, an immobilization mechanism may be integrated into the computer superstructure 515 and carrier assembly 510. The immobilization mechanism includes a means of rigidly coupling computer superstructure 515 and carrier assembly 510, and involves, in one implementation, the insertion of immobilization mechanism struts 520a and 520b into immobilization mechanism channels 525a and 525b, wherein the immobilization mechanism channels 525a and 525b are made up of aligned openings in both sides of the carrier assembly 510, and the computer superstructure 515. In other implementations, the immobilization mechanism struts 520a and 520b may have geometry differing from that shown in FIG. 5, and the number of struts used per HDD 505 may be more or less than the two struts 520a and 520b shown, wherein they may be cylindrical rods, or that single immobilization mechanism strut 520a or 520b depicted in FIG. 5 may be embodied as two or more shorter struts. The immobilization mechanism struts 520a and 520b may be constructed from extruded plastic pieces, or metal plates, or any material with the strength and formability to withstand the compressive and tensile forces to hold an HDD 505 rigid in an isolation system during transport, and during other times with movement of the HDD 505 is not desirable.

Those skilled in the art will know or be able to ascertain, using no more than routine experimentation, many equivalents to the embodiments and practices described herein. For example, the orientation of the HDD in the depicted implementations may be rotated such that the HDD is inserted into a carrier assembly, such as carrier assembly 110 from FIG. 1A, in a vertical orientation rather, than horizontally. It will also be understood that the systems described herein provide advantages over the prior art including the ability to quickly insert and remove an HDD from a carrier, without the use of tools, but such that the carried-HDD coupling impedes vibration transmission.

Accordingly, it will be understood that the invention is not to be limited to the implementations disclosed herein, but is to be understood from the following claims, which are to be interpreted as broadly as allowed under the law.

We claim:

1. A hard disk drive retention system enabling insertion and removal of a hard disk drive there from, comprising:
    a carrier assembly for receiving the hard disk drive;
    a first guide rail coupled to a first side of the hard disk drive, and a second guide rail coupled to a second side of the hard disk drive, said second side parallel and spaced apart from said first side;
    a first guide channel coupled to a first side of the carrier assembly, for receiving the first guide rail, and a second guide channel coupled to a second side of the carrier assembly, for receiving the second guide rail, such that motion of the hard disk drive is constrained in a first direction perpendicular to the first and second guide channels;
    a first spring element coupled to the first side of the carrier assembly, and a second spring element coupled to the second side of the carrier assembly; and
    a first spring compression element coupled to the first side of the hard disk drive, and a second spring compression element coupled to the second side of the hard disk drive, wherein the first spring compression element compresses the first spring element, and the second spring compression element compresses the second spring element, and the resulting spring force acts to resist motion of the hard disk drive in a second and a third direction, wherein the first direction, the second direction, and the third direction are mutually perpendicular.

2. The hard disk drive retention system according to claim 1, wherein the first and the second spring elements couple the hard disk drive to the carrier assembly and form a spring-mass-damper with a damped natural frequency less than a rotational frequency of the hard disk drive.

3. The hard disk drive retention system according to claim 1, further comprising;
    a heat sink surface coupled to the carrier assembly for contacting, and conducting heat away from, the hard disk drive.

4. The hard disk drive retention system according to claim 3, wherein the heat sink surface supports the weight of the hard disk drive in the first direction.

5. The hard disk drive retention system according to claim 3, wherein the spring compression elements are shaped such that compression of the spring elements exerts a component of a spring force in the first direction that presses the hard disk drive against the heat sink surface, and improves thermal contact there between.

6. The hard disk drive retention system according to claim 1, wherein at least one of the first or second spring elements is a leaf spring.

7. The hard disk drive retention system according to claim 1, wherein at least one of the first or second spring elements is composed of a plurality of individual coil springs coupled to a base surface.

8. The hard disk drive retention system according to claim 1, wherein at least one of the first spring element or the second spring element has a first flexure region and a second flexure region that depress when the hard disk drive is fully inserted into the carrier assembly.

9. The hard disk drive retention system according to claim 8, wherein the first and second flexure regions have different shapes, and the first flexure region extends further than the second flexure region from the first or the second side of the carrier assembly.

10. The hard disk drive retention system according to claim 9, wherein at least one of the first compression element or the second compression element has a first contact surface and a second contact surface.

11. The hard disk drive retention system according to claim 10, wherein at least one of the first or the second contact surfaces has a frusto-pyramidal shape.

12. The hard disk drive retention system according to claim 10, wherein when the hard disk drive is fully inserted into the carrier assembly, the first contact surface depresses the first flexure region, and the second contact surface depresses the second flexure region of a respective at least one of the first and the second spring elements.

13. The hard disk drive retention system according to claim 12, wherein, during insertion and removal of the hard disk drive from the carrier assembly, the first contact surface does not contact the second flexure region of the spring element.

14. The hard disk drive retention system according to claim 1, further comprising;
a plurality of mounting brackets coupled to the carrier assembly, for mounting the carrier assembly in a secondary isolation system to prevent transmission of vibrations between carrier assembly and a computer system.

15. The hard disk drive retention system according to claim 1, further comprising;
at least one of the first and the second guide rails having a plurality of pegs spaced along its length, such that the plurality of pegs couple the guide rail to a respective at least one of the first or second sides of the hard disk drive using an interference fit of the plurality of pegs into two or more respective screw holes on the hard disk drive.

16. The hard disk drive retention system according to claim 1, further comprising;
at least one of the first and the second guide rails having a plurality of holes along its length, such that a plurality of screws couple the guide rail to a respective at least one of the first and the second sides of the hard disk drive.

17. The hard disk drive retention system according to claim 14, further comprising;
one of more immobilization mechanism channels on the carrier assembly that allow the carrier assembly to be immobilized for transport when the carrier assembly is coupled to a secondary isolation system.

18. The hard disk drive retention system according to claim 1, further comprising;
a hard disk drive connector on the carrier assembly, for transferring power and data between the hard disk drive and the carrier assembly.

19. The hard disk drive retention system according to claim 18, wherein the hard disk drive connector is loosely coupled to the carrier assembly such that it can move in the first and the second direction.

20. The hard disk drive retention system according to claim 1, further comprising;
the carrier assembly having one or more vent areas for allowing air to circulate through the carrier assembly to the hard disk drive.

21. A hard disk drive isolation system, comprising:
a carrier assembly for receiving the hard disk drive;
a first guide rail coupled to a first side of the hard disk drive, and a second guide rail coupled to a second side of the hard disk drive, said second side parallel and spaced apart from said first side;
a first guide channel coupled to a first side of the carrier assembly for receiving the first guide rail, and a second guide channel coupled to a second side of the carrier assembly for receiving the second guide rail, such that motion of the hard disk drive is constrained in a first direction perpendicular to the first and second guide channels;
a first spring element coupled to the first side of the hard disk drive, and a second spring element coupled to the second side of the hard disk drive;
a first spring compression element coupled to the first side of the carrier assembly, and a second spring compression element coupled to the second side of the carrier assembly, wherein the first spring compression element compresses the first spring element, and the second spring compression element compresses the second spring element, and the resulting spring force acts to resist motion of the hard disk drive in a second and a third direction, wherein the first direction, the second direction, and the third direction are mutually perpendicular.

22. The hard disk drive isolation system according to claim 21, wherein the first and the second spring elements couple the hard disk drive to the carrier assembly and form a spring-mass-damper with a damped natural frequency less than a rotational frequency of the hard disk drive.

* * * * *